United States Patent [19]

Forney, Jr. et al.

[11] 4,096,627

[45] Jun. 27, 1978

[54] METHOD OF FORMING PORT HOLE COAXIAL CONNECTOR

[75] Inventors: Edgar Wilmot Forney, Jr., Harrisburg; Richard Shure Hogendobler, Camp Hill, both of Pa.

[73] Assignee: AMP Incorporated, Harrisburg, Pa.

[21] Appl. No.: 808,758

[22] Filed: Jun. 22, 1977

Related U.S. Application Data

[62] Division of Ser. No. 689,020, May 24, 1976, Pat. No. 4,047,788.

[51] Int. Cl.[2] .............................................. H01G 43/00

[52] U.S. Cl. ......................................... 29/628; 29/517

[58] Field of Search ............. 29/628, 517; 339/177 R, 339/177 E, 276 R

[56] References Cited

U.S. PATENT DOCUMENTS

| | | | |
|---|---|---|---|
| 3,221,290 | 11/1965 | Stark et al. | 339/177 R |
| 3,297,978 | 1/1967 | Stark | 339/177 R |
| 3,384,703 | 5/1968 | Forney, Jr. et al. | 339/177 R X |
| 3,694,793 | 9/1972 | Concelman | 339/177 R X |

*Primary Examiner*—Leon Gilden

*Attorney, Agent, or Firm*—Gerald K. Kita

[57] ABSTRACT

A coaxial connector is disclosed for simultaneous crimping of the center conductor and outer shield made possible by a port hole design of the connector allowing for visual inspection of the center contact, the center conductor and the insulation layer of the cable, the port hole design further permitting orientation and entry of the crimping dies.

1 Claim, 5 Drawing Figures

Fig. 4
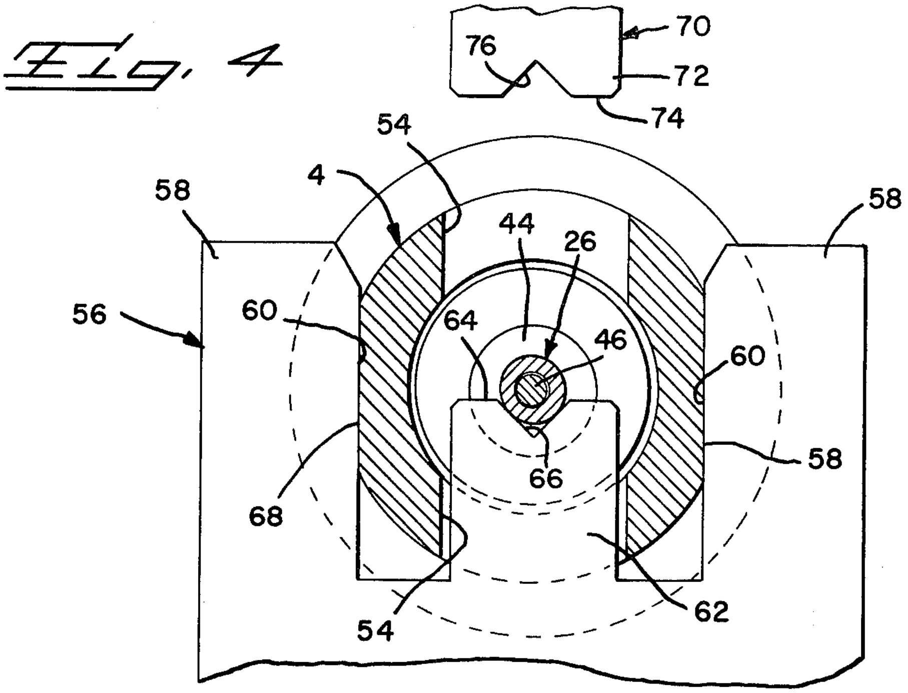
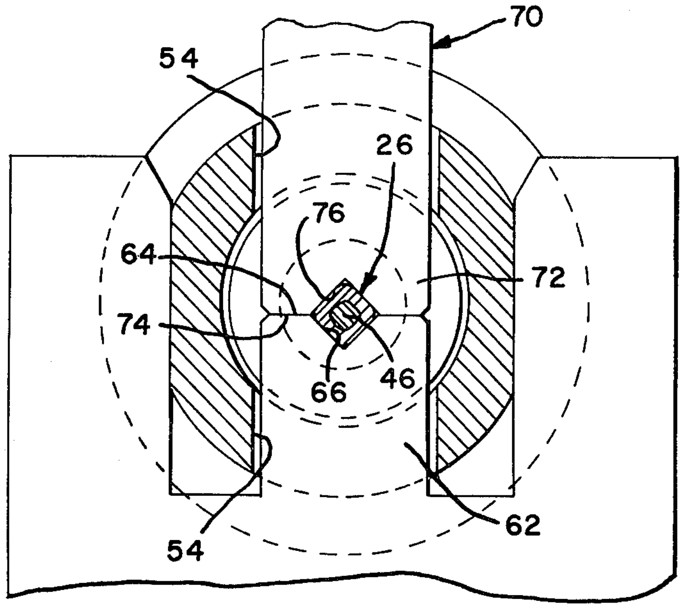
Fig. 5

METHOD OF FORMING PORT HOLE COAXIAL CONNECTOR

This is a division of application Ser. No. 689,020, filed May 24, 1976 now U.S. Pat. No. 4,047,788.

The present invention relates to a coaxial connector of a type wherein port holes permit entry of crimping dies into the connector for cold forming or crimping a center contact to a center conductor of a coaxial cable.

BACKGROUND OF THE PRIOR ART

In U.S. Pat. No. 3,297,978 there is disclosed the concept of providing port holes in a coaxial connector providing access to a center contact in order to crimp the contact to a coaxial cable center conductor. Visual inspection of the connection was difficult as the port holes were relatively small. The lack of visual inspection prevented assurance of proper registration of the center conductor within the contact prior to and after crimping. Also separate crimping operations were required to attach a contact to a center conductor and to attach the conductive shielding of the coaxial cable to the body of the connector. A relatively delicate entry of the crimping dies into the provided port holes was also necessitated.

SUMMARY OF THE INVENTION

The present invention is an improvement over the coaxial connection described in the above-identified U.S. Pat. No. 3,297,978. The connector according to the present invention is divided into three sections, a medial section being relatively larger than a rearward section, and relatively smaller than a forward section. By this construction a ferrule which is used to crimp the conductive shielding of the cable to the rearward section of the connector may be stopped in proper registration against the medial section. Also a dielectric insert in the forward section of the connector which carries a center contact and positions a center contact in the forward section of the connector may be stopped in registration against the medial section. The medial section is further provided with enlarged opposed port holes exposing a barrel or sleeve extension of the center contact supported within the medial section of the connector by the dielectric insert. The port holes are sufficiently large to visually inspect the center contact and the central conductor and the insulation layer of the cable before and after crimping.

Opposed flat surfaces on the medial section permit nesting of the connector within the confines of a first crimping die, with a portion of the crimping die in registration within a port hole for orienting the connector and for engagement on the center contact.

OBJECTS

Accordingly an object of the present invention is to provide a low cost coaxial connector wherein the center conductor and outer shielding are crimped to the connector simultaneously, utilizing port holes in the connector to visually inspect the assembly of parts before and after crimping.

Another object of the present invention is to provide a method for simultaneously crimping the center conductor and the outer shield of a coaxial conductor to a coaxial connector employing port holes to orient the assembled parts on a crimping die and to provide for inspection of the assembly before and after crimping.

These and other objects of the present invention will become apparent to one having ordinary skill in the art from the following detailed description taken in conjunction with the drawings.

BRIEF DESCRIPTION OF THE DRAWINGS

FIGS. 4 and 5 are enlarged sections taken along the lines 4—4 of FIG. 3 illustrating orientation of the connector with respect to one of the crimping dies before and during a crimping operation.

DETAILED DESCRIPTION

Figure 1:
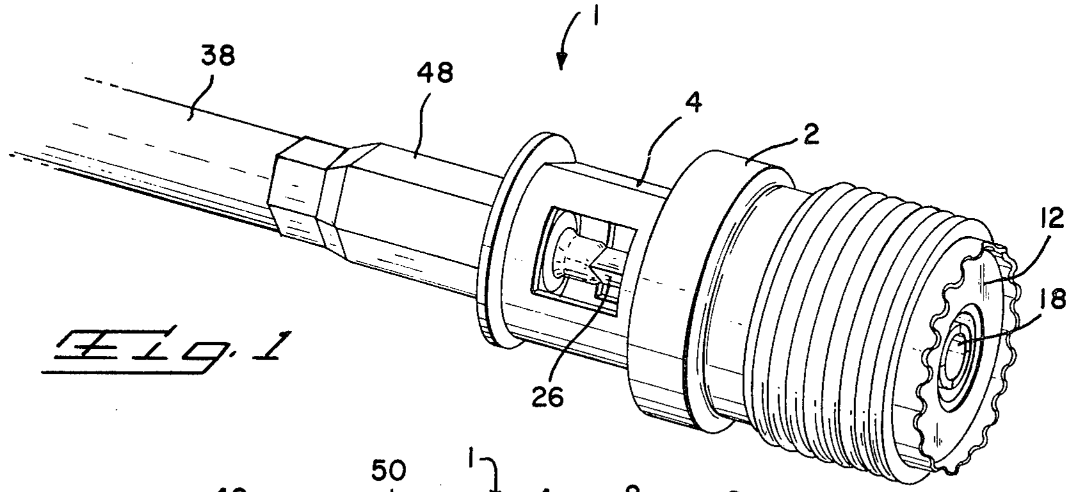
FIG. 1 is an enlarged fragmentary perspective illustrating a preferred embodiment.
Figure 2:
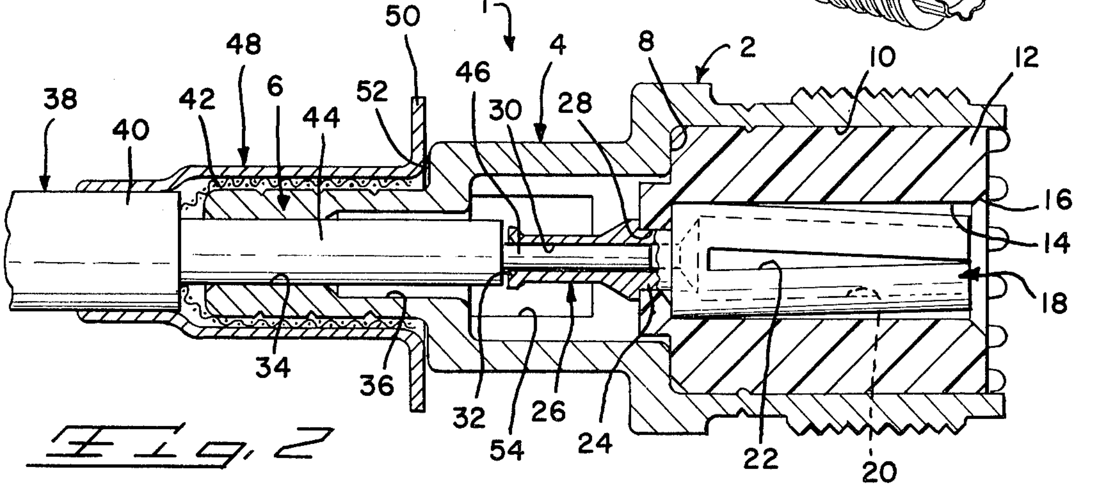
FIG. 2 is an enlarged fragmentary elevation in section of the preferred embodiment prior to crimping.
Figure 3:
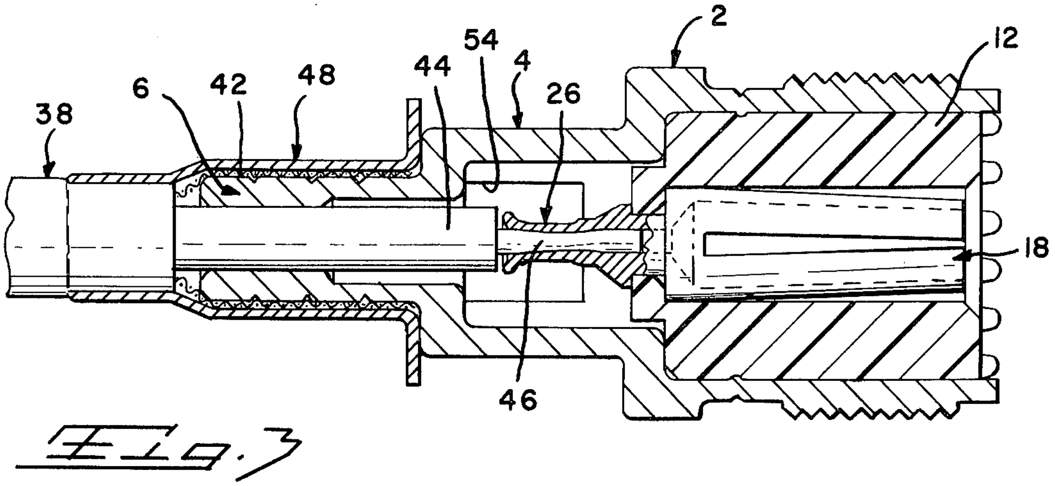
FIG. 3 is an enlarged fragmentary elevation in section of the preferred embodiment after crimping.

With more particular reference to FIGS. 1–3 of the drawings, there is shown generally at 1 a coaxial connector according to the present invention. Prior to crimping as shown in FIG. 2 the connector includes a forward section 2, a medial section 4 and a rear section 6. The sections are generally cylindrical and tandemly aligned, with the medial or central section 4 being relatively larger than the rear section 6 and relatively smaller than the forward section 2. A stepped diameter 8 at the junction of the sections 2 and 4 provides a shoulder stop within hollow interior 10 of the section 2 against which a generally cylindrical dielectric insert 12 is seated when assembled into the interior 10. The insert 12 is generally cylindrical and provided with a central bore 14 having a flared entryway 16. Supported within the bore 14 is an electrical contact in the form of a socket or receptacle 18. The contact alternatively may take the form of an electrical pin which mates electrically internally of the receptacle. In this case the receptacle is of thin wall construction having an interior sidewall 20 provided with a plurality of slots one of which is shown at 22 which expands in width to allow resilient radial expansion upon reception of a complementary pin therein. The contact is provided with a reduced neck portion 24 and a barrel or sleeve portion 26. The neck portion is retained in a relatively reduced portion 28 of the bore 14. The dielectric insert 12 thereby supports the barrel portion 26 in free space within the medial portion 4. The barrel has an interior bore 30 therein provided with a flared entryway 32 which opens toward the rear portion 6 of the connector. The rear portion 6 of the connector has a relatively enlarged bore 34 therein which is stepped to a larger diameter 36. A coaxial cable 38 having an outer jacket 40 covering an electrically conducting shielding jacket 42, which in turn covers an insulation layer 44, which in turn covers a center conductor 46. The cable is prepared by cutting away portions of the insulation layer and the outer jacket 40 to expose a length of center conductor and a length of shielding 42. The prepared cable then is inserted into the end of the bore 34 with the conductive shielding 42 being flared outwardly over the outer diameter of the rear portion 6. The insulation layer supports the conductor in the bore 34. The exposed conductor 46 is inserted forwardly into the bore 30 of the sleeve or barrel 26. A metal ferrule 48 is then slid axially along the cable 38 to initially sandwich the flared shielding 42 against the rear portion 6 of the connector. An integral radially projecting flange 50 is seated against a stepped shoulder stop 52 of the medial portion 4. The medial portion 4 further is provided with a pair of enlarged port holes 54, shown in FIGS. 2, 3, 4 and 5. Visually observed through the port holes are the barrel portion 26, the center conductor 46 and the insulation layer 44, making possible visual inspection for proper assembly of the component parts prior to crimping. As shown in FIGS. 4 and 5, the assembly of parts may then be located by an operator on a lower crimping die which is indicated generally at 56 and has a pair of spaced uprights 58 with opposed vertical surfaces 60 and a center upright 62 forming a crimping die for the center conductor. The upright 62 includes a mating die face provided with a recess 66. As shown the die portion 62 is received through one of the port holes 54 and the recessed portion 56 orienting and supporting the barrel portion 26; the center conductor 46 being observed through the other port hole 54 as being properly assembled to the barrel portion prior to crimping. In addition the medial portion 4 of the connector is nested in desired orientation on the die 56 with opposed flat surfaces 68 of the section 4 in proper registration between and against the vertical surfaces 60 of the die 56. The flat surfaces 68 and port holes 54 are alternately spaced about the periphery of the medial portion 4 of the connector, while the flat surfaces 68 further orient the connector correctly for reception of the die portion 62 through one of the port holes 54. The other port hole 54 may be used for visual inspection of the insulation layer 44, the center conductor 46 and the sleeve or barrel portion 26 for proper assembly while oriented on the crimping die. When such inspection is deemed to indicate proper assembly, an upper crimping die 70 having a die portion 72 provided with a mating face 74 and a recess 76 may be brought into complementary relationship with the die portion 62 as shown in FIG. 5. The die portion 72 enters one of the port holes 54. The recess portions 66 and 76 of the die portion 62 and 72 radially inwardly deform the barrel portion 26, cold forging or crimping the same onto the center contact 46. As shown the mating faces 64 and 74 of the dies abut and limit the amount of deformation of the barrel portion 26.

Another die portion (not shown) is brought down to engage the ferrule 48 thereby cooperating with a similar die portion (not shown) on the lower die 56 to crimp the ferrule in compression over the conductor shielding 42. As shown in FIG. 3 upon completion of crimping the ferrule 48 is crimpingly engaged on the shield 42 sandwiching the shield 42 between the ferrule 48 and the rear portion 6 of the connector, thereby electrically grounding the shielding 42 to the connector. The barrel portion 26 is radially compressed into engagement over the center conductor 46 establishing a crimped connector thereto. The port holes 54 provide for visual inspection of the outer conductor 46, the sleeve or barrel 26 and the insulation layer 44 for proper assembly after crimping.

Although a preferred embodiment of the present invention is described and shown in detail, other embodiments and modifications thereof which would be apparent to one having ordinary skill in the art are intended to be covered by the spirit and scope of the appended claims.

We claim:

1. A method of crimping a coaxial connector, comprising the steps of: inserting a coaxial connector through a rearward portion of a coaxial connector, projecting a center conductor and at least a portion of an insulation layer of said cable into a medial portion of a connector, inserting said center conductor into a barrel portion of an electrical contact supported in a dielectric insert in a forward portion of said connector, visually inspecting said center conductor and said insulation layer and said barrel portion through at least one of a pair of opposed port holes in said medial portion, applying a shielding jacket over said rearward portion, applying a ferrule over said shielding jacket, nesting opposed flat surfaces on opposite sides of said medial portion between opposed walls of a first crimping die, nesting one port hole over at least a portion of said first crimping die, and crimping said ferrule and said barrel portion with said first and a second crimping die through said opposed port holes.

* * * * *